United States Patent [19]

Webb et al.

[11] 3,759,990
[45] Sept. 18, 1973

[54] FORMIC ACID SYNTHESIS

[75] Inventors: Allen N. Webb, Wappingers Falls, N.Y.; Bernardus Cornelis Lippens, Zomergem, Belgium

[73] Assignee: S. A. Texaco Belgium N.V., Brussels, Belgium

[22] Filed: Sept. 15, 1971

[21] Appl. No.: 180,830

[52] U.S. Cl. .............................. 260/542, 252/463
[51] Int. Cl. ............................................ C07c 51/00
[58] Field of Search .................................... 260/542

[56] References Cited
UNITED STATES PATENTS 2,023,003  12/1935  Carpenter ............................ 260/542
2,737,446  3/1956  Hoffman et al ...................... 260/542

Primary Examiner—Vivian Garner
Attorney—Thomas H. Whaley et al.

[57] ABSTRACT

Formic acid is produced by passing carbon monoxide at about 200°C over an oxidic substrate which has a surface layer of hydroxyl groups but which is free of adsorbed water and then removing the product formed from the surface of the substrate. Such removal can be effected by extraction with water or with aqueous alkaline solutions and the substrate can be recycled for the production of additional formic acid.

3 Claims, No Drawings

FORMIC ACID SYNTHESIS

This invention relates to the synthesis of formic acid.

Formic acid is prepared from carbon monoxide and water vapor at 150° to 500°C and a catalyst consisting of acid calcium or zinc phosphate, metals, copper salts, active carbon with a halogen compound. Due to unfavorable equilibrium conditions, high pressures from 200 to 2,000 atm are required.

The present invention circumvents the equilibrium problem. In the process of the invention, carbon monoxide is passed over a partly hydroxylated oxidic substrate at normal or slightly elevated pressure (the partial pressure of the carbon monoxide in the gas may be even below 1 atmosphere) and at a temperature between 100° and 300°C (a fast reaction occurs at 185° to 200°C). Under these conditions carbon monoxide reacts with hydroxyl groups on the surface of the substrate with the formation of formate ions

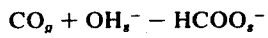
$$CO_g + OH_s^- \rightarrow HCOO_s^-$$

The preferred substrate is eta alumina, which has been so treated that its surface is partly hydroxylated (0.1 to 2.5 m equivalents $OH^-$ per 100 $m^2$ of surface area, preferably 0.2 to 1.0 m equivalents $OH^-$) but is free of adsorbed water.

Other substrates may be used such as modified aluminas, magnesia, zeolites in which the cations are exchanged for hydrogen ions.

The invention is illustrated by the following examples.

EXAMPLE I

Materials

The alumina used was prepared from beta-alumina trihydrate in the form of ⅛ inch pills, by calcination in a tube furnace at 500°C for 2 hours. A stream of air sufficient to keep the maximum moisture contents of the gases in contact with the catalyst below 15 vol percent was passed through the tube during the heating and subsequent cooling. The alumina is substantially eta-type with a surface area of 255m²/g measured with the Ströhlein Areameter. Maximum limits of impurities are indicated in Table I.

TABLE I Alumina Purity

| Impurity | Amount (percent) | Method |
|---|---|---|
| Calcium | <0.01 undetected | atomic absorption |
| Magnesium | <0.01 undetected | atomic absorption |
| Sodium | 0.005 | atomic absorption |
| Potassium | <0.002 undetected | atomic absorption |
| Iron | <0.001 undetected | atomic absorption |
| Copper | <0.001 undetected | atomic absorption |
| Silica | <0.01 undetected | gravimetric |
| Chloride | <0.005 undetected | colorimetric |

EXAMPLE II

In a typical adsorption run 54.33 parts by weight of alumina were used and a total of 1.29 parts by weight of CO 99.971 percent purity were added in nine portions. During heating a rapid up-take of gas occurred at 185°C. Slow adsorption continued at 200°C and the alumina was maintained at this temperature for 3 hours before cooling. After cooling to room temperature the system contained 0.67 parts by weight of CO indicating that 0.62 parts by weight of CO were taken up. Upon removal of the alumina from the reactor its weight was found to have increased by 0.62 parts, which also corresponds to the decrease of CO.

EXAMPLE III

The qualitative formaldehyde-chromotropic acid test was positive for the sodium hydroxide extract of CO treated alumina and negative for a similar (blank) extract of alumina without exposure to CO. Quantitative analyses of several extracts from CO treated aluminas, known and blank runs are shown in Table II. Runs 7, 8 and 9 show that known amounts of formic acid added to alumina (as an 0.786 N aqueous solution) are completely recovered and assayed by the procedure used for unknowns and also indicate the reproducibility of the procedure. Run 10 is a blank showing that the titer for alumina without CO treatment is small, amounting to only 1 percent of the total in CO treated samples. Run 1 shows that water extraction is not very effective, by recovering only 22 percent of the expected formate, while runs 2, 3 and 4 show that either 10% NaOH or 5% $NH_3$ solutions are both effective in recovering 90 or more percent of the theoretical amount of formate. For run 5 a stream of He with 12% $NH_3$ was passed through water at or near boiling temperature and then through the charge of CO treated alumina heated to 130°C in a tube furnace. The condensate was analysed after collecting 5–10ml and only a few percent of the theoretical formate found. Recovery of at least 79 percent (a minimum value due to loss of some wet alumina) from the steamed material shows that the treatment, although ineffective in removing formate, did not destroy it.

TABLE II.—ANALYSES OF EXTRACTS

| Run | Sample | Weight, grams | Extraction | Milliequivalents of formate Calcd. | Milliequivalents of formate Found | Percent of theory |
|---|---|---|---|---|---|---|
| 1 | $Al_2O_3$+CO | 1.29 | 70 ml. $H_2O$ | 1.03 | 0.226 | 22.0 |
| 2 | $Al_2O_3$+CO | 3.27 | 10 ml. 10% NaOH | 2.65 | 2.39 | 90.2 |
| 3 | $Al_2O_3$+CO | 1.14 | 10 ml. 10% NaOH | 0.92 | 0.88 | 95.5 |
| 4 | $Al_2O_3$+CO | 3.02 | 10 ml. 5% $NH_3$ | 2.44 | 2.29 | 94.0 |
| 5 | $Al_2O_3$+CO | 3.76 | Steam at 130° | 3.04 | 0.083 | 2.7 |
| 6 | (5) after steam | <3.76 | 10 ml. 5% $NH_3$ | <3.04 | 2.40 | >79.0 |
| 7 | $Al_2O_3$+HCOOHª | 3.01 | 10 ml. 10% NaOH | 1.57 | 1.61 | 102.6 |
| 8 | $Al_2O_3$+HCOOHª | 3.21 | 10 ml. 10% NaOH | 1.57 | 1.56 | 99.4 |
| 9 | $Al_2O_3$+HCOOHª | 4.52 | 10 ml. 10% NaOH | 3.93 | 3.76 | 95.7 |
| 10 | $Al_2O_3$ | 4.04 | 10 ml. 10% NaOH | | 0.04 | |

ª Added as 0.786 N solution.

What is claimed producing

1. A process for producing formic acid which comprises passing carbon monoxide at a temperature between 100° and 300° C. at about atmospheric pressure over eta alumina prepared by calcining beta-alumina trihydrate at about 500° C. and passing a stream of air thereover to keep the maximum moisture content below 15 volume percent, said eta alumina having a surface layer of hydroxyl groups but which is free of physically adsorbed water and then removing the formate ion from said eta alumina by extraction with water or aqueous alkaline solution.

2. The process of claim 1 wherein said eta alumina has a layer of from 0.1 to 2.5 milliequivalents of hydroxyl ions per 100 meters squared of surface area.

3. The process of claim 1 wherein said eta alumina has a layer of from 0.2 to 1.0 milliequivalents of hydroxyl ions per 100 meters squared of surface area.

* * * * *